Patented June 27, 1944

2,352,547

UNITED STATES PATENT OFFICE 2,352,547

REFINING OF TALL OIL

John D. Jenkins, Milwaukee, Wis., assignor to Pittsburgh Plate Glass Company, Allegheny County, Pa., a corporation of Pennsylvania No Drawing. Application December 19, 1941, Serial No. 423,626

1 Claim. (Cl. 260—97.5)

The present invention relates to the treatment of tall oil and it has particular relation to its treatment for purposes of separating it into components.

One object of the invention is to provide a simple and economical process of treating tall oil whereby resin acids can be separated from fatty acids, sterols and the like, to obtain fractions better adapted for use in resin making, soap making and other arts than is the impure mixture constituting the original mixture.

This and other objects of the invention will be apparent from consideration of the following specification and the appended claim.

Tall oil is obtained in large quantities in the paper industry from the manufacture of paper pulp by the sulfate process. The major constituents of the oil comprise resin acids, fatty acids and some non-acid constituents, such as sterols and the like. The following is a typical composition:

| | Per cent |
|---|---|
| Fatty acids | 50 to 60 |
| Resin acids | 34 to 48 |
| Non-acids | 6 to 10 |

Some of these constituents are, if in pure state, of great value, but in the complex association in which they exist in tall oil they have but little value, and for that reason, use of tall oil, up to the present time, has been very limited.

The present invention contemplates the provision of a process of separating resin acids from tall oil, in which the oil is merely dissolved in a polar solvent containing a considerable amount of water and the solution is then chilled or otherwise subjected to conditions to effect a crystallization of the resin acids. The crystallized material can then be removed by filtration or centrifugation, decantation or similar methods to obtain a solution consisting largely of fatty acids and sterols.

In the practice of the invention, various polar solvents may be employed as the solvent medium for the tall oil. However, it is at the present time considered that monomethyl ether of ethylene glycol is from all angles highly meritorious. Still other polar solvents including furfural and diacetone alcohol are, also, considered as being within the purview of the invention. For best results, these solvent media are admixed with water in suitable proportion. In the case of the monoethyl ether of ethylene glycol, the water ratio, preferably, is within a range of 20 to 80%, based upon the content of the monomethyl ether. If furfural is employed the saturation point is probably about 4 or 5% at ordinary atmospheric temperatures. If diacetone alcohol is employed, it may contain about 11% of water.

The ratio of tall oil to solvent is variable; but in the case of the monomethyl ether of ethylene glycol its concentration in the solvent is about 2 to 50%.

In order to effect crystallization, the solution may be allowed to stand quietly at room temperature, or it may be stirred occasionally to permit crystallization to occur. Crystallization is permitted to continue until a sufficient amount of the resin acids have thus been precipitated. If desired, the crystallization may be promoted by chilling the solution or by evaporating away the solvent. The crystals can be separated at any convenient manner, for example, by decantation, centrifugation or the like methods. Residual solvent and fatty acids can be removed by washing with water or the like. The crystals consist essentially of the resin acids which can be used in the preparation of soaps, paper sizes and for other purposes.

The fatty acids and the non-acids including sterols and the like are retained in the solvent medium and may be recovered by evaporating the latter to dryness, or by extracting it with petroleum naphtha. If it is desired to separate the non-acid constituents including the sterols from the fatty acids, the latter may be saponified with potassium or sodium hydroxide in water solution and the non-acids then extracted by means of ether or naphtha. The products of saponification may be acidified in order to liberate the free acids which can then be employed for various purposes including the manufacture of soaps, resins and the like.

Alkyd type resins may be prepared by admixing glycerol or glycol or a mixture of the two with recovered fatty acids or recovered resin acids and phthalic anhydride. The ratio of phthalic anhydride to fatty acids may be approximately equimolar, and the total phthalic anhydride and free acid should be approximately molecularly equivalent to the polyhydroxy alcohol. The mixture is heated to reaction temperature, as evidenced by evolution of water. The reaction is continued for several hours, or until desired consistency of the product is obtained. The tall oil acids may be either fatty or resin acids.

Resin acids can be saponified with caustic soda added to a water suspension of paper pulp. By acidifying the soap or by adding alum a size is precipitated upon the pulp.

The sterols may be recovered from the non-acid fractions by appropriate treatment and are suitable for use as sources of pharmaceuticals, and other uses.

The forms of the invention herein described are to be considered merely as exemplary. It will be apparent to those skilled in the art that numerous modifications may be made therein without departure from the spirit of the invention or the scope of the appended claim.

What I claim is:

A process of separating resin acids from tall oil, which process comprises dissolving the oil in a polar solvent selected from the group consisting of mono methyl ether of ethylene glycol, and diacetone alcohol, the solvent containing a substantial amount of water, crystallizing out the resin acids from the solution and separating them from the liquid residue.

JOHN D. JENKINS.